(12) United States Patent
Hiller et al.

(10) Patent No.: US 8,584,370 B2
(45) Date of Patent: Nov. 19, 2013

(54) ABSOLUTE VALUE TRANSDUCER WITH DISCONTINUITY IN CODED ABSOLUTE POSITION

(75) Inventors: Bernhard Hiller, Berlin (DE); Axel Loharens, Berlin (DE); Roland Kirchberger, Berlin (DE); Michael Schneider, Constance (DE)

(73) Assignee: Baumer Huebner GmbH, Berlin (DE)

( * ) Notice: Subject to any disclaimer, the term of this patent is extended or adjusted under 35 U.S.C. 154(b) by 178 days.

(21) Appl. No.: 13/301,264

(22) Filed: Nov. 21, 2011

(65) Prior Publication Data
US 2012/0124848 A1 May 24, 2012

(30) Foreign Application Priority Data
Nov. 22, 2010 (DE) .......................... 10 2010 061 737

(51) Int. Cl.
*G01B 11/26* (2006.01)
(52) U.S. Cl.
USPC ............................................. 33/1 PT; 33/706
(58) Field of Classification Search
USPC ................... 33/1 PT, 706, 707, 708
See application file for complete search history.

(56) References Cited

U.S. PATENT DOCUMENTS

| | | | | |
|---|---|---|---|---|
| 5,129,725 A | * | 7/1992 | Ishizuka et al. | 33/707 |
| 6,158,132 A | * | 12/2000 | Kofink et al. | 33/1 PT |
| 7,411,530 B2 | * | 8/2008 | Kopken | 341/115 |
| 2012/0124848 A1 | * | 5/2012 | Kirchberger et al. | 33/1 PT |
| 2012/0124849 A1 | * | 5/2012 | Hiller et al. | 33/1 PT |

* cited by examiner

*Primary Examiner* — G. Bradley Bennett
(74) *Attorney, Agent, or Firm* — McGrew and Tuttle, P.C.

(57) ABSTRACT

An absolute value transducer (1) for determining an absolute position (P) of a body (6), with a measured material element (5), as well as a process for determining the absolute position (P) of two bodies (3, 4, 6) in relation to one another. In order to be able to use the absolute value transducer (1) in as flexible a manner as possible and to detect mounting errors of the measured material element (5), provisions are made according to the present invention for a code (K) of the measured material element (5) to have a discontinuity (9) in its course and for the code (K) to be scanned outside the discontinuity for determining the absolute position (P) within the discontinuity (9), and for the scanned absolute values (W) to be combined with an offset value (A).

17 Claims, 5 Drawing Sheets

ABSOLUTE VALUE TRANSDUCER WITH DISCONTINUITY IN CODED ABSOLUTE POSITION

CROSS REFERENCE TO RELATED APPLICATIONS

This application claims the benefit of priority under 35 U.S.C. §119 of German Patent Application DE 102010061737.7 filed Nov. 22, 2010, the entire contents of which are incorporated herein by reference.

FIELD OF THE INVENTION

The present invention pertains to an absolute value transducer for determining an absolute position of a body in relation to the absolute value transducer, with at least one measured material element extending along a measuring path, which has a code of the absolute position with measured position values, and with at least two sensors, by means of which the code can be scanned during the operation.

BACKGROUND OF THE INVENTION

Furthermore, the present invention pertains to a process for determining an absolute position of two bodies in relation to one another, in which a code containing absolute position values of the absolute position is repeatedly scanned and an absolute position signal representative of the absolute position is generated and sent.

Absolute value transducers with measured material elements are generally well known. Physical or three-dimensional absolute positions are determined by these absolute value transducers and represented as absolute position values. In order to be able to determine the absolute position at each point along a measuring path, the measured material elements are designed without gaps. For example, annular measured material elements are placed on shafts to be able to determine their rotational position absolutely. Such a measured material element usually comprises a single continuous code. Absolute value transducers differ from incremental transducers in that they are able to provide the absolute position of the body during switching on, as soon as they are provided with power, at a starting intersection. The detection preferably takes place directly by scanning the code of the measured material element. On the other hand, an incremental transducer does not provide a signal representative of the absolute position, but rather a signal representative of a change in position at a starting intersection.

One-piece measured material elements are not practical especially for determining the actual position of large bodies, for example, of a shaft driving a generator of a wind power plant, since they are very large and can be manufactured and mounted at a high cost only. Furthermore, weight deviations of the shaft cannot be readily compensated with a one-piece measured material element.

Furthermore, measured material elements are difficult to manufacture for irregular measuring paths. For example, to produce motions of the body along a measuring path that is composed of translational and/or rotational motions, a corresponding measured material element, which is possibly of an irregular shape, should be manufactured in one piece. A manufacture of such a measured material element is very susceptible to manufacturing tolerances, however.

SUMMARY OF THE INVENTION

Therefore, an object of the present invention is to improve the prior-art absolute value transducers, such that they can be used in a flexible manner and place lower requirements on the mounting and structure of the measured material element.

The object is accomplished for the absolute value transducer mentioned in the introduction by the code having at least one discontinuity in its pattern.

The object is accomplished for the process mentioned in the introduction by the code having a discontinuity in its pattern and one of the measured position values of the code outside the discontinuity being combined with an offset value for determining the absolute position within the discontinuity.

The solution according to the present invention is of a simple design and has the advantage that discontinuities of the code of the measured material element make possible a more flexible mounting of the measured material element and can be bridged over by the absolute value transducer and this can deliver valid measured position values even in the area of the discontinuities. This is possible even if the coded absolute position in the area of the discontinuity does not represent an absolute position of the body or the code in the area of the discontinuity is discontinuous or incomplete.

The solution according to the present invention can be further improved by various embodiments, which are each advantageous per se and can be combined with one another as desired. These embodiments and the advantages connected with them are dealt with below.

Thus, in a variant, the discontinuity may comprise a gap in the measured material element and/or a point of discontinuity in the code. Gaps in the measured material element make possible an adjustment in the length or position, in which the code is interrupted by an especially unknown length. They enable the measured material element to be adapted to the unknown geometry of the body, whose position shall be determined. For this, the measured material element may be designed as flexible and possibly elastically deformable even along the measuring path. Extensions of the measuring path can be compensated by the gap, even if the measured material element is made essentially inflexible at least along the measuring path. Furthermore, the gap may also be caused by damage or defects. Points of discontinuity may form, for example, due to an incorrect mounting of the measured material element along the measuring path. They also form if sections with different codes meet.

According to another advantageous embodiment, the code may be composed of a plurality of code sections, which are arranged one after the other along the measuring path and at least two of which are separated from one another by the at least one discontinuity. The code of sequential code sections may reproduce the absolute position essentially continuously, i.e., sequential code sections do not have a point of discontinuity at the discontinuity, such that the absolute value transducer can detect the absolute position at any time at least during the operation.

So that the code may be simple and composed, for example, of an assembly kit system, the code sections may be coded identically, as an alternative. For example, a plurality or all code sections of the measured material element may begin at a minimal measured position value of, for example, zero and end at an identical maximum value. Thus, the sequence of the code sections does not need to be taken into consideration in the composition of the code. Points of discontinuity, which are caused by the transition from minimal to maximal measured position value or vice versa, occur between the code sections at the discontinuity.

If a discontinuity between two code sections passes one of the sensors of the absolute value transducer, it may be advantageous if the absolute value transducer detects and stores this passing of the discontinuity at least temporarily. It is thus guaranteed that the absolute value transducer can determine the absolute position not only within the code section, but rather in all code sections, even if at least some of the code sections are coded identically.

The discontinuity in a shaft encoder may especially be embodied and used as a coding element for detecting the number of full revolutions. In this embodiment, a multiturn shaft encoder is obtained, whose absolute signal is composed of a single turn position and a multiturn position. In the single-turn position, the position is coded with a full revolution, and it is detected by means of the code sections of the measured material element. The multiturn position detects the number of full revolutions and optionally while taking the direction of rotation into consideration.

To be able to compose the measured material element in as simple a manner as possible, the code sections may be formed as separate one-piece parts of the measured material element. Each of the parts may have especially exactly one code section, such that the discontinuity is arranged at least one transition between two parts or code sections. The parts may be dimensioned and embodied, such that they can be arranged by an assembler simply along the measuring path and fastened to the body. Large or irregular measuring paths can thus be reproduced in a simple manner and without high cost due to a plurality of parts.

The absolute value transducer may have a compensator for compensating the discontinuity, wherein the compensator may be connected on the input side to the sensors and on the output side to an absolute position value output unit of the absolute value transducer in a signal-transmitting manner. The absolute position values derived from the measured values and the absolute position values representing the absolute position are in contact with a signal output of the absolute position value output unit. The absolute position values can be outputted via the signal output contained in the absolute position signal. Each of the measured position values scanned by one of the sensors can be combined with a compensation factor and optionally the offset value in the compensator, as a result of which deviations of the measured position values from the absolute value, which are generated by the discontinuity, can be compensated. The compensation factor can be determined individually for each code section, for example, in a training run during the startup of the absolute value transducer and depend on the extent of the discontinuity.

If the parts are mounted along the measuring path, such that these are, for example, fastened to the body not meeting, but rather with a distance to one another forming the gap, the absolute value transducer may still determine the absolute position. For this, the sensors may be arranged along the measured material element or measuring path at spaced locations from one another. The distance of the sensors to one another may advantageously correspond at least to the extent of the gap. It is especially advantageous when the distance of the sensors to one another along the measuring path is greater than the extent of the gap. It is thus guaranteed that at least one of the sensors can read valid measured values of a code section at any time. Incorrect mountings of the parts along the measuring path do not compromise the startup of the absolute value transducer at least within certain limits. Moreover, dimensional tolerances of the body, for example, otherwise unacceptable tolerances of the diameter of the shaft can be compensated by targeted use of the gaps. The length of the gap along the measuring path can be varied for compensating the tolerances.

For compensating the discontinuity, the code can, for example, be scanned at a first and a second measurement point at the same time by one of the sensors, respectively, wherein the measurement points are arranged at spaced locations from one another along the measured material element carrying the code. The distance of the measurement points to one another can be predetermined by the distance of the sensors from one another. If one of the sensors delivers invalid measured position values, the position of this sensor may be determined with reference to the body based on the measured position values determined by the other sensor. For this, the measured position values determined by the other sensor are to be combined with the offset value and optionally with the compensation factor. The offset value may correspond to the distance of the measurement points or the sensors to one another and be placed in a memory unit of the absolute value transducer. The memory unit may be connected in a signal-transmitting manner on the input side to at least one of the sensors and/or on the output side to an absolute position value output unit of the absolute value transducer. As long as at least one of the sensors scans valid measured position values of the measured material element, the absolute position of the body in relation to each sensor of the absolute value transducer can be determined.

In order to decide which sensor shall be polled for determining the absolute position, measured position values of the first measurement point can be used for a predetermined quantity of measured position values. For other measured position values of the first measurement point, measured position values of the second measurement point can be used for the determination of the absolute position. For example, the first sensor for measured position values, which are arranged in a predetermined distance of, for example, 10 measured position values from the discontinuity, can be polled. If the first sensor is closer to the discontinuity than predetermined, then the measured position values of the second sensor are used. For this, a switching means may be provided, which switches to the at least one other sensor depending on the measured position value determined by one of the at least two sensors. By switching, the output of the other sensor is analyzed.

As an alternative or in addition, the plausibility of the code of at least one of the measurement points, for example, of the first measurement point, may be checked. Based on the result of the check, the code of each other and, for example, the second measurement point can be used for the determination of the absolute position. The coded measured position values may not be plausible especially in the area of the discontinuity, but also in case of damage to the measured material element or errors in the code. However, these implausible measured position values at the one measurement point do not impair the determination of the absolute position, when plausible or valid measured position values are present at the other measurement point.

If the body shall be moved in the switched-off state of the absolute value transducer, the absolute value transducer might lose the absolute position of the body and no longer correctly determine it after a restartup, since the absolute value transducer might no longer determine which code section is currently being scanned by the sensors for determining the absolute position, for example, in identically designed code sections. In another advantageous embodiment, the absolute value transducer may consequently comprise a sensor that detects a passing of discontinuities even in the switched-off state of the absolute value transducer. The sensor can be connected in a signal-transmitting manner to a nonvolatile memory that documents the movement past the discontinuity at the sensor and along the measuring path.

The function of this sensor may be reproduced in one of the two sensors in another advantageous embodiment. As an alternative, the sensor may be embodied as a separate sensor. The sensor may especially comprise an operating energy for the generator generating the nonvolatile memory and send a signal to the nonvolatile memory, when it passes the discontinuity. During the passing of the discontinuity, a memory value in the nonvolatile memory unit can be changed. The energy contained in the signal can be used to change values of the nonvolatile memory, even if the absolute position value transducer is switched off. At least one component driving the generator, for example, a magnet, can be arranged in the discontinuity and especially in the gap.

An incorrect mounting of the measured material element at right angles to the measuring path may also lead to an inaccurately determined absolute position. If the measured material element is arranged, for example, at a circular cylindrical body, for example, a shaft or a hub, it may seem that the measured material element is arranged radially offset compared to an optimal position on the measuring path. In a flat or arched body, the incorrectly mounted measured material element can be mounted offset at right angles to the body. This problem may occur both in a one-piece, manageable measured material element with only one code section and in a measured material element comprising a plurality of code sections or parts and lead to measurement inaccuracies. The solution to this problem shown below is independent of the previously discussed embodiments of the absolute value transducer and especially advantageously of the measured material element and can also be used produced separately.

Thus, the absolute value transducer may have a testing unit for detecting mounting errors of the measured material element especially at right angles to its curve or at right angles to the measuring path. The testing unit may be connected to the two sensors on the input side in a signal-transmitting manner and send an error signal representative of the mounting errors at its signal output.

Mounting errors of the measured material element provided with the code and mounted on the body can thus be detected especially at right angles to the measured material element or to the measuring path or to the body by at least two measured position values different from one another being scanned at the same time and being fed to a processing step, by means of which an error signal representative of the mounting errors can be generated in the testing unit.

For example, the measured position values of the measurement points offset to one another can be scanned and be fed to a further process step for generating the error signal in a position-corrected manner. For position correction, the offset value and/or the compensation factor can be combined with measured position values of one of the measurement points. For example, the offset value and/or the compensation factor can be subtracted from the determined measured position values or can be added to these. For this process step, the testing unit may have an addition or subtraction module that is connected on the input side to one of the sensors and position-corrected measured position values are in contact with the output thereof.

The position-corrected measured position values of the one sensor correspond in the ideal case, i.e., in a perfectly mounted measured material element, to the measured position values of the other sensor. An incorrect mounting of the measured material element at right angles to the measuring path or to the body may, however, lead to the position-corrected measured position values not corresponding to the measured position values of the other sensor. For the determination of the manner and extent of the incorrect mounting, the position-corrected measured position values may be, for example, subtracted directly from one another and an error signal may be derived from the resulting result. In the ideal case, the result of this calculation would be constant for all measured position values and would be especially 0. However, in case of an incorrect mounting, the result may deviate from the constant value.

As an alternative, deviations of the measured position values from ideal measured position values can be determined and these deviations are consequently analyzed for determining the error signal and are especially subtracted from one another.

If a plurality of measured position values of each one of the sensors are subject to one of these processes, then a value pattern representative of the manner and extent of the incorrect mounting is produced which can be sent as an error signal for analysis or displayed to a user. As an alternative, the absolute value transducer can determine the manner and extent of the incorrect mounting based on the value pattern or on the error signal automatically.

An alternative process for determining the incorrect mounting involves speed values being derived from the measured position values of the two measurement points, based on which the error signal is generated. For generating the error signal, the speed signals may represent relative speeds of the two bodies to one another which in turn can be subtracted from one another in a position-corrected manner. The result of this process step can again be sent as an error signal representative of the incorrect mounting or be automatically analyzed.

For determination of the absolute position of the two bodies to one another, it may be necessary to convert the determined measured position values into the absolute position values. For this, the absolute value transducer may be moved at least once completely along the measuring path in relation to the body, for example, after the mounting of the measured material element, and the measured position values scanned by the sensors can be stored. Based on the stored measured position values, incorrect mountings of the measured material element or of the individual parts at right angles to the measuring path as well as the extent of the discontinuities can be determined. A conversion rule can be generated from this for the determination of the absolute position—for example in the form of a conversion rule or a conformity list taking the offset value and the compensation factors into consideration. Furthermore, the quantity of measured position values, for which a selected sensor shall deliver values for the determination of the absolute position, can be determined.

The error of a self-contained measured material element must again be zero in an absolute value transducer after a full revolution back to the initial value because the measured material element has the initial value again at this point. A possibly remaining residual error may be distributed to the discontinuity and/or to the entire measured material element.

The present invention is explained below using examples based on exemplary embodiments with reference to the drawings. The different features of the embodiments may be combined here independently of one another, as was explained in the individual advantageous embodiments already. The various features of novelty which characterize the invention are pointed out with particularity in the claims annexed to and forming a part of this disclosure. For a better understanding of the invention, its operating advantages and specific objects attained by its uses, reference is made to the accompanying

DESCRIPTION OF THE PREFERRED EMBODIMENTS

Referring to the drawings in particular, first, the structure and function of an absolute value transducer 1 are described with reference to the exemplary embodiment in FIG. 1. The absolute value transducer 1 may have an analyzing unit 2, which can be connected in a signal-transmitting manner to a first and to a second sensor 3, 4. Furthermore, the absolute value transducer 1 may comprise at least one measured material element 5. The measured material element 5 can be fastened to a body 6, whose absolute position P shall be determined with reference to the absolute value transducer 1 or with reference to one of the two sensors 3, 4. For this, coded absolute positions P are read as measured position values in the measured material element 5 and the absolute position P is derived from the measured position values.

In the exemplary embodiment shown the measured material element 5 is fastened to a body 6 with a circular cylindrical design. The body 6 may be embodied as a hub or shaft of a wind power plant and, for example, the rotor hub or a shaft driving a generator. Of course, the absolute value transducer 1 according to the present invention may also be used with other shafts, hubs or bodies 6, which are shaped otherwise and possibly moved not only rotationally. The measured material element 5 can be arranged along a measuring path M, wherein the measuring path M in the exemplary embodiment shown here runs parallel to a peripheral direction U on a jacket surface of the body 6. The absolute value transducer 1 is thus shown as a shaft encoder.

As an alternative, the absolute value transducer 1 may also determine the absolute positions P of bodies 6 which undergo translational motion. The absolute value transducer 1 may also determine combinations of translational and rotational motions of the body 6 with reference to the absolute value transducer 1 or in relation to its sensors 3, 4. For this purpose, the measured material element 5 may be arranged along any predetermined measuring path M.

In order to be able to arrange the measured material element 5 along the desired measuring path M in a simple manner and without problems, the measured material element 5 may comprise a plurality of one-piece parts 7, which can be arranged separately on the body 6 or along the measuring path M. As a result of this, measured material elements may also be mounted on bodies 6, even if the body 6 is relatively large. For example, a shaft for a generator of the wind wheel may have a diameter of up to one meter or more. Individual parts 7 of the measured material element 5 may also be simply mounted on the jacket of the shaft, possibly by an individual assembler.

In the exemplary embodiment shown here, the measured material element 5 comprises, for example, four parts 7, which are arranged one after the other along the measuring path M, such that the body 6, in its peripheral direction U, is essentially surrounded by the parts 7 forming the measured material element 5.

Along the measuring path M, the parts 7 may have the code of the absolute position P of the body 6, which can be scanned by the two sensors 3, 4. The code may have the measured position values, which may take on discrete values. Along the measuring path M, the ends 8 of the parts 7 may be arranged as meeting or at spaced locations from one another along the measuring path M or in the peripheral direction U. As an alternative to separately manageable parts 7, the measured material element may also be manufactured from a plurality of parts 7 which are connected to one another in a one-piece manageable manner.

It may be that the absolute position P of the body 6 between two adjacent parts 7 or between the ends 8 of the two parts 7 pointing towards one another is not represented as expected by measured position values. For example, the measured position values in the area of the ends 8 of two codes of parts 7, which ends 8 are adjacent to one another, may have an unexpectedly large difference to one another, which does not represent the true, physical distance of the coded measured position values in the area of the adjacent ends 8 to one another. This difference may lead to an unexpected point of discontinuity of the code. Furthermore, the code may be interrupted at least between the ends 8, which are adjacent but at spaced locations from one another. Such a gap in the code may be caused, for example, by ends 8 of two parts 7, which are arranged at spaced locations from one another. It may also be that the parts 7 in the area of the ends 8 are not coded or are not coded correctly. The absolute value transducer can detect both the difference not representing the true distance and the gap as a discontinuity in the code.

To be able to pick up the absolute position P of the body even within the discontinuity 9, the sensors 3, 4 may be arranged along the measuring path M, such that at least one of the two sensors 3, 4 can always receive valid measured position values outside the discontinuity 9 of the measured material element 5. Here, the sensors 3, 4 may be arranged along the measuring path M at spaced locations from one another at least so far that the distance of the sensors 3, 4 to one another corresponds at least to the geometric dimensions of the discontinuity 9 or to the true distance along the measuring path M. The distance of the sensors 3, 4 to one another may especially be greater than the geometric dimensions of the discontinuity 9. The distance of the two sensors 3, 4 may be predetermined or determined during the startup and known in the absolute value transducer 1.

As an alternative, the measured material element 5 may consist of a single piece that can be arranged along the measuring path M and, for example, wound about the body 6. Along the measuring path M or in the peripheral direction U of the body 6 in the exemplary embodiment shown here, the two ends 8 of such a measured material element 5 can be arranged opposite one another along the measuring path M. With a full rotation of the body 6 about its longitudinal axis Z, only one discontinuity 9, which is arranged in the area of the ends 8 or between them, is determined per rotation in such an embodied measured material element 5. This measured material element 5 may thus have a continuous code, which is arranged in a single code section along the measuring path M and is interrupted at only one point by the discontinuity 9.

If the measured material element 5 comprises a plurality of parts 7, then each of the parts may have such a code section, in which the absolute position P is clearly coded. The parts 7 may be coded identically, such that the absolute position P within each of the parts 7 can be clearly detected. The quantity of the measured position values of each part 7 may be identical. The absolute position of the body 6 over a plurality of parts 7 can be determined by determining the discontinuities 9 passed during a motion of the body 6. Furthermore, the parts 7 may comprise individual identification data. As an alternative, the parts 7 may be coded, such that they represent a continuously coded absolute position P up to the discontinuities 9.

Figure 1:
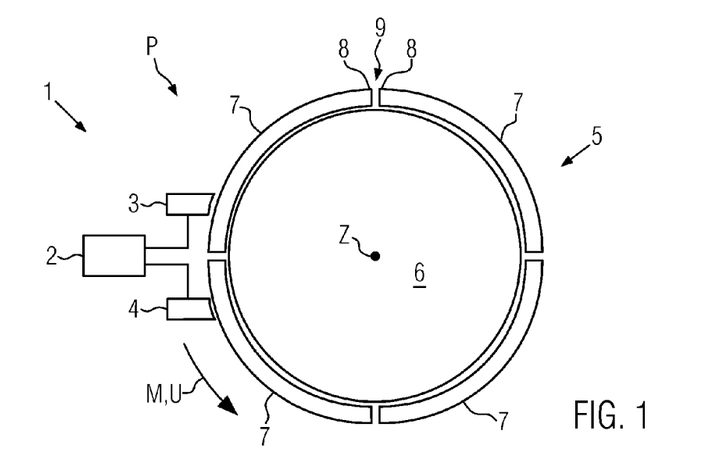
FIG. 1 is a schematic view of a first exemplary embodiment of an absolute value transducer according to the present invention.
Figure 2:
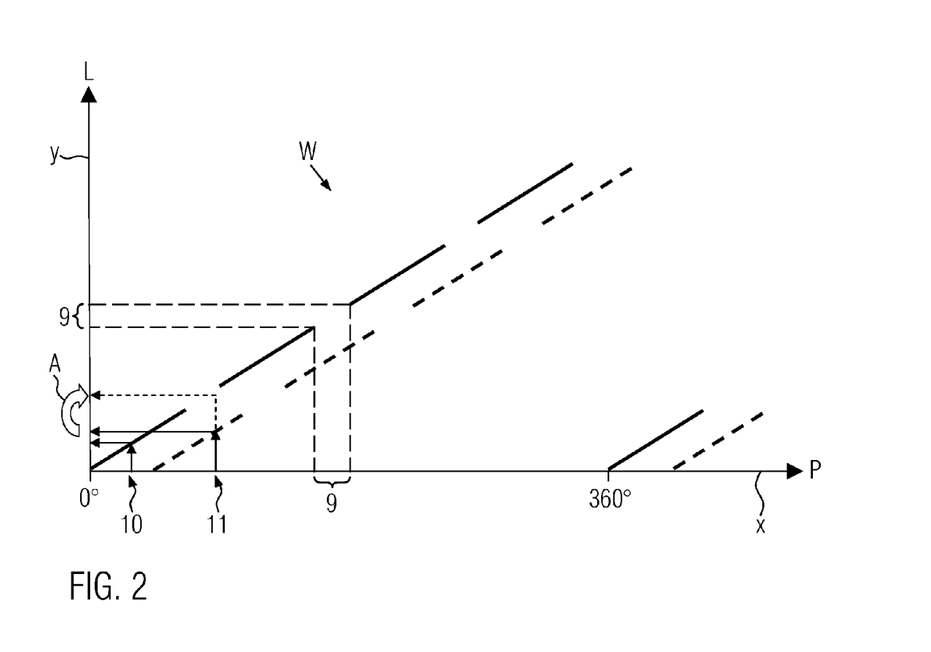
FIG. 2 is a schematic view of measured position values, which are generated with the absolute value transducer of the exemplary embodiment of FIG. 1.

FIG. 2 shows measured position values W of the absolute value transducer 1 of the exemplary embodiment of FIG. 1 picked up by the sensors 3, 4.

FIG. 2 also shows possible measured position values W of the shaft encoder 1 of the exemplary embodiment of FIG. 1 in a system of coordinates. Picked-up, valid measured position values W of the sensor 3 are shown as solid sections and of sensor 4 as dotted sections. The actual, physical absolute position P of the shaft 6 is plotted on the X axis of the system of coordinates, and the derived absolute position values L are plotted on the Y axis. In the view shown, sensor 3 passes over five parts 7 of the measured material element 5 of the exemplary embodiment of FIG. 1. This corresponds to a rotation of the body 6 about its longitudinal axis Z by approximately 450°.

The determination of the absolute position values L based on the determined measured position values W is shown at two support points 10, 11 as an example. The sensor 3 over one of the parts 7 or over the code section thereof is located at the support point 10. The measured position value W can clearly be assigned to the corresponding absolute position value L. In the support point 11, the body is further rotated, such that the sensor 3 is arranged over a discontinuity 9 formed as a gap and cannot read any valid measured position values W from the measured material element 5. However, the second sensor 4 is arranged over the code section of the part 7 read by the sensor 3 before the rotation and delivers a valid measured position value W.

For the determination of the absolute position value L of the body 6 after the rotation and with reference to the sensor 3, the measured position value W picked up at the support point 11 is converted into a preliminary absolute position value L, to which an offset value A is subsequently added for the determination of the true absolute position value L with reference to the sensor 3. In the exemplary embodiment shown, the offset value A corresponds to the distance of the two sensors 3, 4 to one another along the measuring path M and can be stored in absolute position values L or measured position values W in the absolute value transducer 1.

The measured position values W of the sensors 3, 4 lie each on a straight line here. This means that the ends of the code sections of two parts 7 are coded corresponding to their true, physical distance to one another. Thus, the discontinuity 9 forms here exclusively due to the absence of measured position values W in the gap between the parts 7.

The difference in the coded measured position values W in the area of the ends 8 of the sequential parts 7 may, however, also be greater or smaller than the true distance, which leads to a point of discontinuity. The individual sections of the measured position values W, which are assigned to each of the parts 7, would, in such a case, not lie aligned with one another on a straight line, but rather would be arranged in parallel offset to this straight line. At least in such a case, a training run for learning the relationship between the determined measured position values W and absolute position values L or absolute positions P would be carried out. The length of the discontinuity 9, for example, the gap, along the measuring path M may likewise vary, which may additionally lead to a shift of the linear sections along the straight line representing the measured position values W. Further error sources, such as, for example, a local extension or rotation of the measured material element 5 in its mounting or due to environmental effects, may have an effect on the position or alignment of the sections of valid measured position values W or the extent of the discontinuity 9.

In order to determine which of the sensors 3, 4 shall be used for determining the absolute position P, the plausibility of the measured position values W of one of the sensors 3, 4 can be determined. If the measured position values W of the one sensor 3, 4 are not plausible, for example, invalid or completely absent, then the measured position values W of the other sensor 4, 3 can be used and be combined with the offset value A. As an alternative or in addition, measured position values W of one of the sensors 3, 4 can be analyzed only for a predetermined quantity of measured position values W. The scanned measured position values W of the other sensor 4, 3 may be used beyond this quantity of measured position values W.

Figure 3:
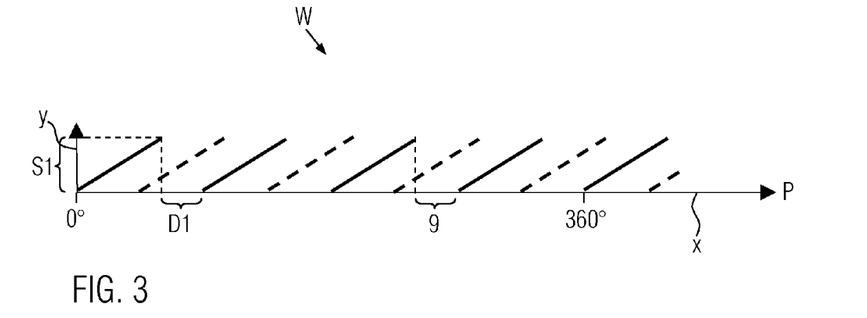
FIG. 3 is a schematic view of measured position values, which are generated with an absolute value transducer according to another exemplary embodiment.

FIG. 3 shows another exemplary embodiment, wherein the same reference numbers are used for components that correspond to the components of the exemplary embodiment of FIG. 1 or 2 in terms of function and/or structure. For the sake of brevity, only the differences to the exemplary embodiments of FIGS. 1 and 2 are dealt with.

FIG. 3 shows measured position values W, wherein the parts 7 of the exemplary embodiment of FIG. 1 are all coded identically.

In contrast to the exemplary embodiment of FIG. 2, it is necessary for determining the absolute position value L for the absolute value transducer 1 to have information about the scanned part 7 in each case. Since the parts 7 are coded identically, the absolute value transducer 1 can determine this information itself, for example, by counting out the passed discontinuities 9. At a transition from one part 7 to another part 7, e.g., after a gap D1, the code jumps at a point of discontinuity S1 by, for example, 1,000 measured position values or even units.

Figure 4:
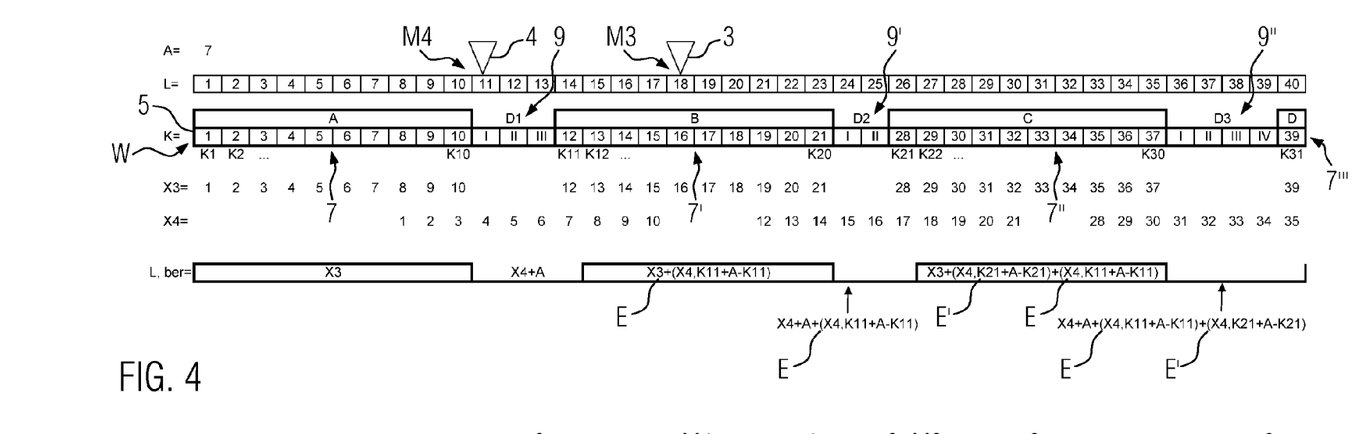
FIG. 4 is a schematic view of exemplary embodiment of the process for determining absolute position values based on measured position values.

FIG. 4 shows a schematic view of an exemplary embodiment of a process for determining absolute positions P based on measured position values W, which is formed with an absolute value transducer 1 according to the exemplary embodiments of FIGS. 1 and 2. The discontinuities 9 of FIG. 4 may additionally have points of discontinuity S besides gaps D.

In the exemplary embodiment shown, the distance between the two sensors 3, 4 is seven measured position values W or units, such that the offset value A is equal to seven. The sensors 3, 4 are arranged at measurement points M3, M4 with reference to the measured material element 5. Absolute position values L are plotted on the line L. The code of the measured material element 5 with four parts 7, 7', 7", 7"', which have a code section A, B, C, D each, is shown in line K. Discontinuities 9, 9', 9" are arranged between the parts 7, 7', 7", 7"'. Each of the discontinuities 9, 9', 9" comprises a gap D1, D2, D3, by means of which the parts 7, 7', 7", 7"' are arranged at spaced locations from one another along the measuring path M. The gap D1 is three units, the gap D2 two units and the gap D3 four units. Furthermore, the discontinuity 9 is formed with a point of discontinuity with an extent of minus two units. The discontinuity 9' comprises a point of discontinuity of four units and the discontinuity 9" is formed with a point of discontinuity with an extent of minus three units.

The code sections A, B, C, D comprise different quantities of measured position values W, wherein the part 7 begins with a measured position value W of one, which is arranged at a position K1. In the position K2 following the position K1, the measured position value W is equal to two. In all parts 7, 7', 7", 7"', sequential positions Kn are each provided with sequential measured position values W.

Lines X3, X4 show the measured position values W detected by the two sensors 3, 4 during the passing over of the measured material element 5. In the area of the gaps D1, D2, D3, the sensors 3, 4 do not detect any measured position values W, since these are not present here. Due to the distance of seven units between the sensors 3, 4, the received measured position values W of the two sensors 3, 4 are, however, offset to one another by the offset value of seven, such that gaps D1, D2, D3 in the scanned measured position values X3 are bridged over by measured position values W in line X4.

A conversion rule for converting the scanned measured position values W into absolute position values L is shown as an example in the line L,ber. The absolute position P of the body 6 shall be determined here with reference to the sensor 3. If the sensor 3 passes over the code section A, then the measured position values W, X3 received from it may be assigned or correspond directly to the absolute position values L. For example, the part 7 is a first or reference part.

In gap D1, the sensor 3 does not detect any measured position values W, such that the measured position values L are determined from the received measured position values W, X4 of the sensor 4, to which the offset value A is added. This position correction may also be performed at position K11 of code K. The thus calculated value is designated here as W, X4, K11.

Already starting from position K12, received measured position values W, X3 of the sensor 3 may be used again. Since the discontinuity 9 has not only a gap D1, but also a point of discontinuity, however, the error caused by the point of discontinuity is also to be compensated. Consequently, a compensation factor E is to be added to the received measured position value W, X3. The compensation factor E is composed of the measured position value W, X4, K11 read by the sensor 4 at the point K11, the offset value A and the valid measured position value W at the point K11, wherein the value W, X, K11 is added to the offset value A and the measured position value W of the point K11 is subtracted from this.

In the discontinuity 9' the received measured position value W, X4 of the sensor is to be combined additively with the offset value A as well as with the compensation factor E. This may also be done at the point K21. For example, starting from point K22, the measured position value W, X3 received by the sensor 3 may be additively combined with the offset value A, the compensation factor E, as well as with another compensation factor E'. The other compensation factor E' may be designed analogously to the factor E, wherein the respective measured position values W are related to the current part 7" of the measured material element—the measured position value W, X4, K21 received by the sensor 4 at the point K21 is additively combined with the offset value A and the value of point K21 is subtracted from this.

In the gap D3 of the discontinuity 9" as well as at the point K31, the measured position value W, X4 received by the sensor 4 can again be additively combined with the offset value A. Moreover, the two compensation factors E, E' are combined with the measured position value W, X4.

The measured position values W, X3, X4 scanned by the sensors 3, 4 of other parts 7 of the measured material element 5 may also be analogously position-corrected and converted into absolute position values L.

Figure 5:
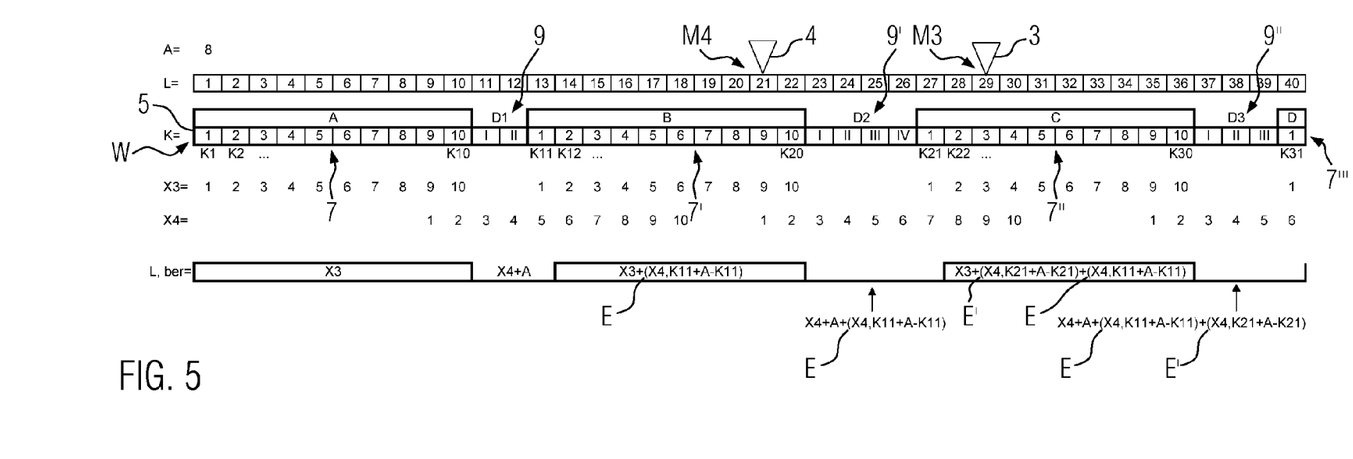
FIG. 5 is a schematic view of another exemplary embodiment of the process for determining absolute position values based on measured position values.

FIG. 5 shows a schematic view of an exemplary embodiment of a process for determining absolute position P based on measured position values W, in which the parts 7 of the measured material element 5 as shown in FIG. 3 are coded identically.

The distance A of the two sensors 3, 4 to one another is eight measured position values W or units here.

The respective parts 7, 7', 7", 7"' are arranged separated from one another by discontinuities 9, 9', 9" and especially by gaps D1, D2, D3 along the measuring path M. The gap D1 is two units, the gap D2 four units and the gap D3 three units. At the transition from one part 7, 7', 7", 7"' to another part 7, 7', 7", 7"', the point of discontinuity is minus ten units. The lines X3, X4 again indicate the received measured position values W. The line L,ber again shows a conversion rule, as an example, used for position correction and determination of the absolute position values L based on the received measured position values X3, X4. The conversion rule shown in the exemplary embodiment of FIG. 4 may also be used in the exemplary embodiment of FIG. 5.

Figure 6:
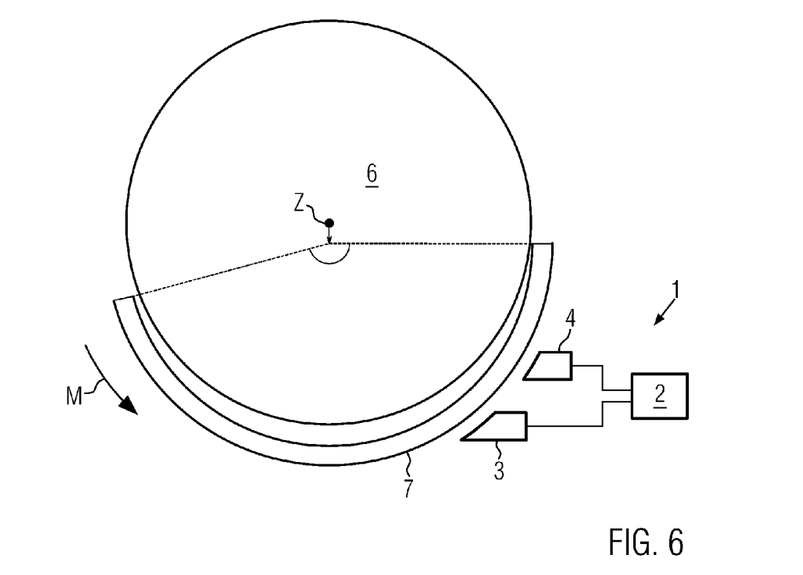
FIG. 6 is a schematic view of another exemplary embodiment of the absolute value transducer according to the present invention with incorrectly mounted measured material element.

FIG. 6 shows another exemplary embodiment of the absolute value transducer 1 according to the present invention, wherein the same reference numbers are used for components that correspond to the components of the exemplary embodiments of FIGS. 1 through 5 in terms of function and/or structure. For the sake of brevity, only the differences to the exemplary embodiments of FIGS. 1 through 5 are dealt with.

In the exemplary embodiment of FIG. 6, only one part 7 of the measured material element mounted on the body 6 is shown. Additional parts 7 may already be mounted or may still be mounted later. As an alternative, the measured material element 5 may comprise only one part 7. The shown position of the part 7 is shown incorrectly mounted at right angles to the measuring path M or to the body 6, as a result of which the read measured position values W can no longer be readily assigned to the absolute position P.

In the exemplary embodiment shown, the part 7 is arranged offset radially from the longitudinal axis Z of the body 6. Nevertheless, to be able to determine the absolute position P exactly, it may be necessary to determine the deviation of the mounting position of the part 7 from the desired position along the measuring path M. Particularly in not easily accessible or very large bodies 6, it may, however, be difficult to determine this deviation exactly, e.g., by means of dedicated devices. Such a task may arise even without problems connected with the discontinuity 9.

The absolute value transducer 1 according to the present invention may be used, for example, for determining the incorrect mounting. For this, the part 7 may be moved along the measuring path M past the sensors 3, 4 and these two sensors 3, 4 receive measured position values W from the part 7 at the same time for the determination of the manner and extent of the incorrect mounting and forward measured position values W to the analyzing unit 2. In the analyzing unit 2, the determined measured position values W of the two sensors 3, 4 can be compared to one another, which results in an error signal F representative of the manner and extent of the incorrect mounting, which is shown in FIG. 7.

Figure 7:
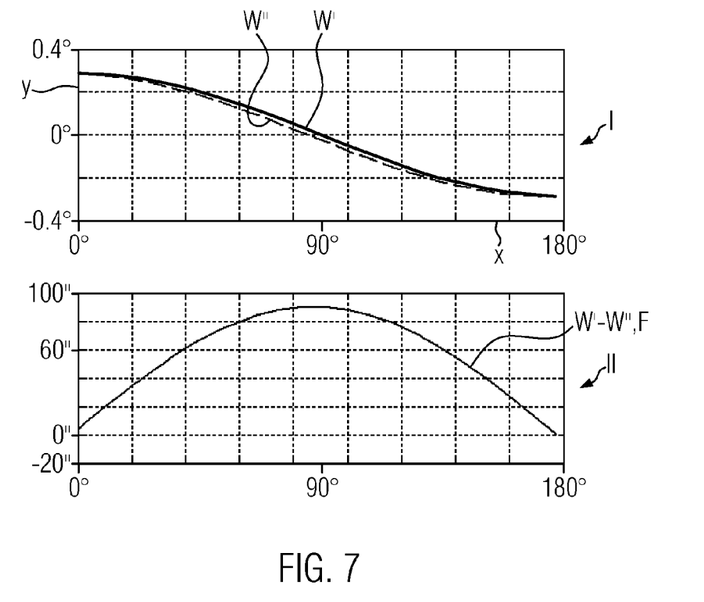
FIG. 7 is a schematic view of processed measured position values, which are determined with the absolute value transducer of the exemplary embodiment of FIG. 4.

FIG. 7 shows processed measured position values W' and W", which each originate from one of the sensors 3, 4. The measured position values W" of the sensor 4 are position-corrected by combining with the offset value A. For example, the offset value A can be added to the measured position value W determined by the sensor 4. If measured position values W of different parts 7 are used, the compensation factor K, which takes the discontinuity 9 into consideration, is still to be used for the position correction. By means of this position correction of the measured position values W', W", these can be compared to one another directly.

Graph I of FIG. 7 shows the deviation of the determined measured position values W', W" from an ideal curve of expected measured position values to be measured. It is recognizable that the position-corrected measured position values W', W" lie close to one another at the beginning, i.e., at, for example, 0°. These measured position values W', W" may be picked up in the area of one of the ends 8 of the part 7, which is arranged very close to the measuring path M. In their curve, these measured position values W', W" are removed from one another up to a maximum distance at approximately 90° in order to then lie close to one another again at approximately 180°. The curve shown here as an example corresponds to the radial offset of the part 7 of FIG. 6, wherein its ends 8 are arranged close to the measuring path M and its middle has a maximum distance to the measuring path M. In the ideal mounting state, if the part 7 extends along the measuring path M, here by 180° about the body 6, the absolute position values W, W' of the sensors 3, 4 are superimposed.

Graph II of FIG. 7 shows, as the error signal F, the difference in the deviation of the measured position values W', W" from the ideal measured position values. The curve shown is almost 0 at approximately 0° and 180° and reaches its maximum at 90°.

Depending on the shape and extent of the incorrect mounting, the resulting shape patterns of the deviation of the determined measured position values W', W" from the ideal measured position values and also the deviation resulting herefrom and of the error signal F may be characteristic of the respective incorrect mounting. For the determination of the manner and extent of the present incorrect mounting, the determined curves can be represented to a user or assembler or analyzed automatically by the absolute value transducer 1 approximately at the startup of the absolute value transducer.

Figure 8:
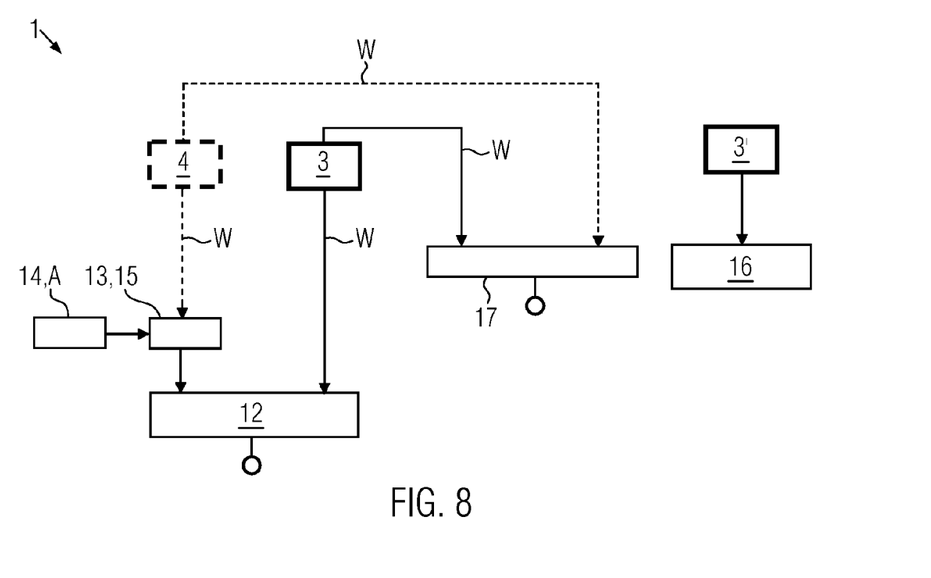
FIG. 8 is a schematic view of functional units of the absolute value transducer according to the present invention in another exemplary embodiment.

FIG. 8 shows another exemplary embodiment of the absolute value transducer 1 according to the present invention, wherein the same reference numbers are used for components that correspond to the components of the exemplary embodiments of the previous figures in terms of function and/or structure. For the sake of brevity, only the differences to the exemplary embodiments of the previous figures are dealt with.

FIG. 8 schematically shows the absolute value transducer 1 with various functional units. The functional units may be embodied here as separate components or as functions of an individual component, for example, of the analyzing unit 2. As an alternative or in addition, each of the functional units can be embodied as software.

The two sensors 3, 4 may be connected in a signal-transmitting manner to an absolute position value output unit 12 of the absolute value transducer 1, wherein the measured position values W of one of the sensors 3, 4, for example, of the first sensor 3, can be sent unchanged to the absolute position value output unit 12. The second sensor 4 arranged at a distance to the sensor 3 can at first be connected in a signal-transmitting manner to a position correct unit 13 and can transmit the measured position values W determined by it to this unit 13. The position correction unit 13 can be connected in a data-transmitting manner to a memory unit 14, in which the offset value A can be permanently stored. The compensator, which combines the determined measured position values W at least with the offset value A and adds these, for example, to one another, may be provided in the position correction unit 13. As a result of this combination, the position correction unit 13 may send the position-corrected measured position values W of the sensor to the absolute position value output unit 12.

Based on predetermined measured position values W or based on a plausibility check of one of the supplied measured position values W, the absolute position value output unit 12 can automatically decide which of the supplied measured position values W shall be used for the determination of the absolute position P. As an alternative, an inspection unit (not shown here), to which the measured position values W of both sensors 3, 4 are fed and which sends only one of the two measured position values W after its checking to the absolute position value output unit 12 for the determination of the absolute position P, may be arranged between the absolute position value output unit 12 and the sensors 3, 4.

In order to be able to recognize passing discontinuities 9, another sensor 3' may be provided. As an alternative, the function of the other sensor 3' may be performed by one of the sensors 3, 4. If one of the discontinuities 9 passes the other sensor 3', then this sensor 3' recognizes the passing discontinuity 9 and sends a signal to a nonvolatile memory 16. The passing of the discontinuities 9 can be documented in the nonvolatile memory 16. As a result of this, the function of a so-called multiturn shaft encoder, for example, can be reproduced. Furthermore, each of the parts 7 scanned in particular by the sensors 3, 4 can be identified.

To be able to recognize the absolute position P of the body 6 with reference to the sensors 3, 4 as well, when the body 6 was moved along the measuring path M in the switched-off state of the absolute value transducer 1, the other sensor 3' may be embodied as a generator and for example as a so-called microgenerator. During the passing of the discontinuity 9, the generator may generate a signal, even in the switched-off state of the absolute value transducer 1, which can be documented in the nonvolatile memory 16. The discontinuity 9, and especially the gaps D1, D2, D3, may comprise at least one component actuating the microgenerator, for example, a magnet.

If the incorrect mounting of the measured material element 5 shall also be detected by means of the absolute value transducer 1, this may comprise a testing unit 17. The measured position values W of both sensors 3, 4 on the input side may be fed to the testing unit 17. In the testing unit 17, an error signal F that is representative of the manner and extent of the incorrect mounting can be generated and subsequently sent. For example, the determined measured position values W may be compared to ideal measured position values in the testing unit 17. The representative signal as shown in the description of the exemplary embodiment of FIG. 7 can be generated here. As an alternative, the determined and position-corrected measured position values W can be analyzed directly or relative speeds between the sensors 3, 4 and the body 6 along the measuring path M that are derived from the measured position values W of the two sensors 3, 4 are determined. The determined speeds may also be used for the determination of the signal F representing the incorrect mounting and be subtracted from one another, for example, for this. The testing unit 17 can be connected in a signal-transmitting manner to the compensator 15 or to the absolute position value output unit 12, such that corresponding inaccuracies in the absolute position determination possibly due to the incorrect mounting of the measured material element 5 can be compensated.

Figure 9:
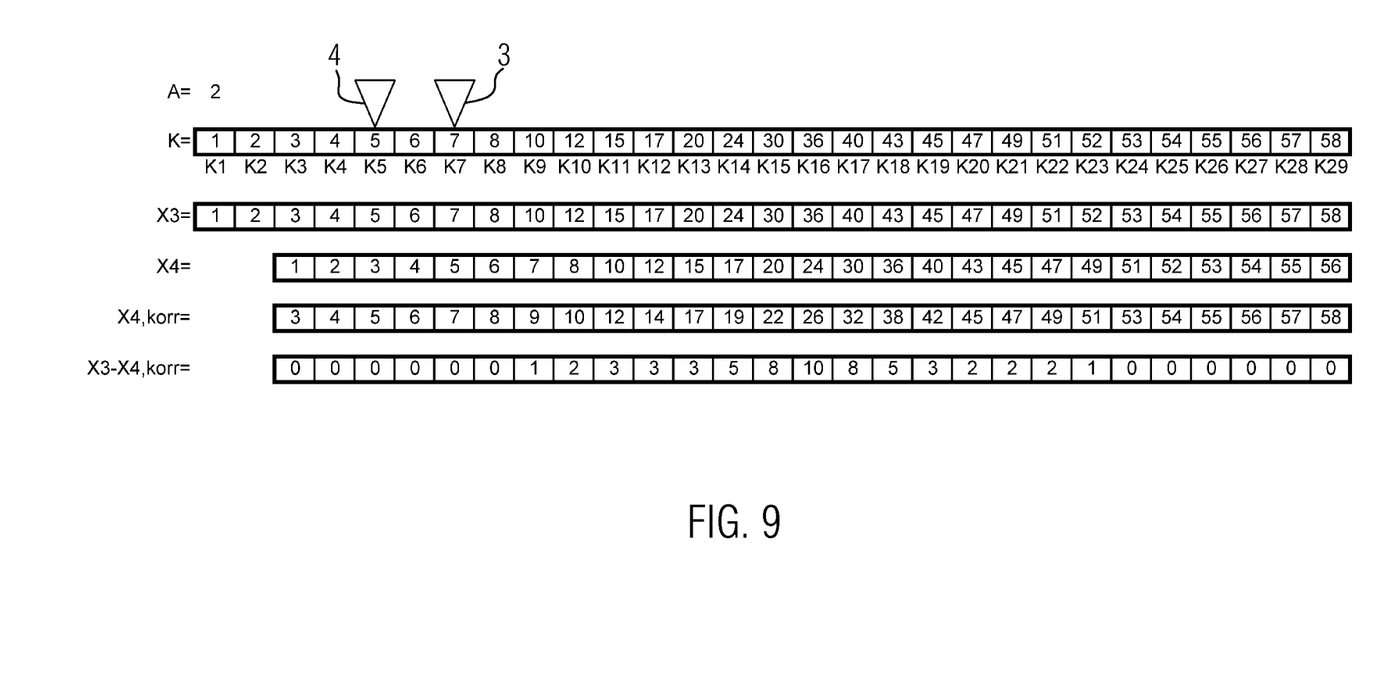
FIG. 9 is a schematic view of a process for determining an incorrect mounting of a measured material element.

FIG. 9 shows an exemplary embodiment of a process for determining the incorrect mounting of the measured material element 5.

In the exemplary embodiment of FIG. 9, the measured material element 5 is incorrectly mounted in a middle area and curves, for example, from the measuring path M in the direction of the sensors 3, 4. This exemplary embodiment is similar to the exemplary embodiment of FIG. 6. The measured material element 5 along the measuring path M is arranged in the area of the code positions K1 through K8 and K22 through K29. In the area of the positions K9 through K20, the position of the measured material element 5 deviates from the measuring path M at right angles to same. As a result of this, measured position values W lying next to one another appear to be closer to one another from the view of the sensors 3, 4, which during the operation may lead to a faster change in the measured position values W in the area of the positions K9 through K20 and is shown by omitting measured position values W.

In this exemplary embodiment the distance between the sensors 3, 4 is only two units. The line X3 shows the measured position values W scanned by the sensor 3, and line X4 shows the measured position values W scanned by the sensor 4. Line X4,korr shows measured position values W, X4 that have been position-corrected and received by the sensor 4. The offset value A is added to same for the position correction of the received measured position values W, X4.

In line X3-X4,korr, the measured position values W, X4, which have been position-corrected and scanned by the sensor 4, are subtracted from the measured position values W, X3 scanned by the sensor 3. As long as the measured material element 5 runs along the measuring path M, i.e., in the area of the positions K1 through K8 and K24 through K29, the difference in the position-corrected measured position values K is constant and especially 0. In the area of the positions K9 through K23, however, this difference deviates from the constant value, wherein the difference reaches its maximum at the position K16. Both the extent and shape of the incorrect mounting can be determined based on the shape of the malfunction resulting from the difference values.

While specific embodiments of the invention have been shown and described in detail to illustrate the application of the principles of the invention, it will be understood that the invention may be embodied otherwise without departing from such principles.

What is claimed is:

1. An absolute value transducer for determining an absolute position of a body in relation to the absolute value transducer, the absolute value transducer comprising:
   at least one measured material element, which extends along a measuring path and which has a code of the absolute position with measured position values, said code having at least one discontinuity along a course thereof; and
   at least two sensors, by means of which said code of the absolute position with measured position values is scanned during operation.

2. An absolute value transducer in accordance with claim 1, wherein said at least one discontinuity comprises a gap in said measured material element and/or a point of discontinuity in said code.

3. An absolute value transducer in accordance with claim 1, wherein said code is composed of a plurality of code sections, which are arranged one after the other along the measuring path and at least two of said code sections are separated from one another by said discontinuity.

4. An absolute value transducer in accordance with claim 3, wherein said code sections are coded identically.

5. An absolute value transducer in accordance with claim 3, wherein said code sections are formed as separate one-piece parts of said measured material element and said discontinuity is arranged on at least one transition between two parts.

6. An absolute value transducer in accordance with claim 1, further comprising:
   an absolute position value output unit; and
   a compensator for compensating for said discontinuity, said compensator being connected on an input side to said sensors and being connected on an output side to said absolute position value output unit in a signal-transmitting manner.

7. An absolute value transducer in accordance with claim 6, wherein:
   said sensors are arranged at spaced locations from one another along said measured material element;
   a distance of said sensors to one another corresponds at least to an extent of said discontinuity in a direction of said measured material element;
   said compensator has a memory unit as well as an adding unit;
   said distance of said sensors to one another is stored in said memory unit;
   said adding unit is connected on an input side to said memory unit in a data-transmitting manner and is connected to at least one of said sensors in a signal-transmitting manner; and
   said adding unit is connected on an output side to said absolute position value output unit.

8. An absolute value transducer in accordance with claim 1, further comprising
   another sensor; and
   a nonvolatile memory connected to said another sensor in a signal-transmitting manner, wherein said another sensor sends a signal to said nonvolatile memory when said another sensor passes said discontinuity.

9. An absolute value transducer in accordance with claim 8, wherein said another sensor comprises a generator generating operating energy for said memory.

10. An absolute value transducer in accordance with claim 1, further comprising
    a testing unit for detecting mounting errors of said measured material element, including mounting errors at right angles to a course of said measured material element, wherein said testing unit is connected on an input side of said testing unit to said at least two sensors in a signal-transmitting manner, and an error signal representative of detected mounting errors is sent at a signal output of said testing unit.

11. An absolute value transducer in accordance with claim 10, wherein said testing unit has a subtraction module with a subtraction module signal output providing measured position values scanned by said sensors during operation that are position-corrected and subtracted from one another.

12. A process for determining an absolute position of two bodies in relation to one another, the process comprising the steps of:
- providing an absolute value transducer with at least one measured material element, which extends along a measuring path and which has a code of the absolute position, said code having at least one discontinuity along a course thereof and at least two sensors;
- repeatedly scanning said code of the absolute position, containing measured position values;
- generating an absolute position signal representative of the absolute position; and
- sending said generated absolute position signal wherein said discontinuity and one of said measured position values of said code outside said discontinuity is combined with an offset value for determining the absolute position within said discontinuity.

13. A process in accordance with claim 12, wherein:
- said step of scanning said code includes scanning said code at a first and at a second measurement point at the same time,
- said wherein first and second measurement point are arranged at spaced locations from one another along said measured material element carrying said code; and
- an offset value is provided that corresponds to a distance of said first and second measurement points to one another.

14. A process in accordance with claim 13, wherein said measured position values of said first measurement point are used for a predetermined quantity of measured position values, and for other measured position values, said measured position values of said second measurement point are used for determining the absolute position.

15. A process in accordance with claim 14, wherein:
- a plausibility of measured position values of said first measurement point are checked; and
- based on a result of said plausibility check, said measured position values of said second measurement point are used for determining the absolute position.

16. A process in accordance with claim 12, wherein a memory value of a nonvolatile memory unit is changed when passing said discontinuity.

17. A process in accordance with claim 12, wherein mounting errors of a measured material element provided with said code and mounted at one of two bodies, including mounting errors at right angles to said measured material element, are detected by at least two measured position values, which are different from one another, being scanned at the same time and being fed to a processing step, by means of which an error signal representative of said mounting errors is generated.

* * * * *